United States Patent
Komatsu

(10) Patent No.: US 10,598,106 B2
(45) Date of Patent: Mar. 24, 2020

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi (JP)

(72) Inventor: Takehiro Komatsu, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 105 days.

(21) Appl. No.: 15/957,309

(22) Filed: Apr. 19, 2018

(65) Prior Publication Data

US 2018/0313279 A1 Nov. 1, 2018

(30) Foreign Application Priority Data

Apr. 28, 2017 (JP) ................................ 2017-089185

(51) Int. Cl.
  *F02D 41/00* (2006.01)
  *F02D 13/02* (2006.01)
  *F02D 41/18* (2006.01)

(52) U.S. Cl.
  CPC ..... *F02D 41/0007* (2013.01); *F02D 13/0261* (2013.01); *F02D 41/18* (2013.01); *F02D 2041/001* (2013.01); *F02D 2041/002* (2013.01); *F02D 2200/0406* (2013.01)

(58) Field of Classification Search
  CPC ............... F02D 41/00; F02D 2041/002; F02D 2041/001; F02D 2200/0406; F02D 41/18; F02D 13/0261

USPC ....... 60/605.2; 123/406.46, 406.51, 488, 492
  See application file for complete search history.

(56) References Cited

U.S. PATENT DOCUMENTS

| | | | |
|---|---|---|---|
| 5,003,950 A * | 4/1991 | Kato | F02D 41/045 123/406.46 |
| 5,803,048 A * | 9/1998 | Yano | F02D 31/005 123/443 |
| 6,843,230 B2 * | 1/2005 | Iizuka | F01L 1/022 123/406.46 |

(Continued)

FOREIGN PATENT DOCUMENTS

| | | |
|---|---|---|
| JP | 2005-240750 | 9/2005 |
| JP | 2012-149552 | 8/2012 |

(Continued)

*Primary Examiner* — Hoang M Nguyen
(74) *Attorney, Agent, or Firm* — Oblon, McClelland, Maier & Neustadt, L.L.P.

(57) ABSTRACT

A control device for an internal combustion engine includes an electronic control unit configured to predict a first intake air amount in a case where an overlapping period in which both of an intake valve and an exhaust valve of a cylinder of the internal combustion engine are open is set to be a first period, predict a second intake air amount in a case where the overlapping period is set to be a second period shorter than the first period with a valve timing of the exhaust valve being advanced, predict that scavenging will occur in the overlapping period in a case where the first intake air amount is greater than the second intake air amount, and predict that the scavenging will not occur in a case where the first intake air amount is equal to or smaller than the second intake air amount.

4 Claims, 5 Drawing Sheets

(56) References Cited

U.S. PATENT DOCUMENTS

| | | | | |
|---|---|---|---|---|
| 8,090,519 B2 * | 1/2012 | Soejima | ................. | F02D 37/02 123/406.23 |
| 2004/0007211 A1 * | 1/2004 | Kobayashi | .......... | F02D 41/1401 123/472 |

FOREIGN PATENT DOCUMENTS

| | | |
|---|---|---|
| JP | 2016-28204 | 2/2016 |
| JP | 2016-169641 | 9/2016 |

* cited by examiner

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2017-089185 filed on Apr. 28, 2017 including the specification, drawings and abstract is incorporated herein by reference in its entirety.

BACKGROUND

1. Technical Field

The disclosure relates to a control device for an internal combustion engine and a control method for an internal combustion engine.

2. Description of Related Art

In an internal combustion engine provided with a turbocharger, an intake pressure may become higher than an exhaust pressure due to the turbocharger and so-called scavenging in which air blows from an intake side to an exhaust side through the inside of a cylinder may occur in an overlapping period in which both of an intake valve and an exhaust valve are open (hereinafter, refer to as overlapping period). For example, there is a technique in which an in-cylinder pressure sensor that detects the pressure in a cylinder is provided, an intake pressure and an exhaust pressure are estimated based on the in-cylinder pressure sensor, and it is predicted that scavenging will occur in a case where the intake pressure is greater than the exhaust pressure (for example, refer to Japanese Unexamined Patent Application Publication No. 2012-149552 (JP 2012-149552 A)).

SUMMARY

However, when the in-cylinder pressure sensor is provided, there is a possibility of an increase in manufacturing cost of the internal combustion engine. Therefore, it is desired to accurately predict whether the scavenging will occur or not with a method different from that in the related art.

The disclosure provides a control device for an internal combustion engine and a control method for an internal combustion engine with which it is possible to accurately predict whether scavenging will occur or not with a method different from that in the related art.

A first aspect of the disclosure relates to a control device for an internal combustion engine. The internal combustion engine is provided with a turbocharger. The control device includes an electronic control unit. The electronic control unit is configured to predict a first intake air amount that is an amount of air taken into the internal combustion engine in a case where an overlapping period in which both of an intake valve and an exhaust valve of a cylinder of the internal combustion engine are open is set to be a first period, predict a second intake air amount that is an amount of air taken into the internal combustion engine in a case where the overlapping period is set to be a second period shorter than the first period with the valve timing of the exhaust valve being advanced, predict that scavenging in which air blows from the intake valve side to the exhaust valve side through the inside of the cylinder will occur in the overlapping period in a case where the first intake air amount is greater than the second intake air amount, and predict that the scavenging will not occur in a case where the first intake air amount is equal to or smaller than the second intake air amount.

The expression "a case where the first intake air amount is greater than the second intake air amount" means a case where an intake air amount is also increased when the overlapping period becomes longer. Here, it is considered that the intake air amount in the overlapping period is the sum of an in-cylinder air amount, which is the amount of air introduced into the cylinder, and a scavenging flow rate, which is the flow rate of air flowing due to the scavenging. Here, it is considered that the in-cylinder air amount is not changed even when the valve timing of the exhaust valve is changed such that the overlapping period is changed. Since the in-cylinder air amount is not changed even when the valve timing of the exhaust valve is changed and the overlapping period is lengthened, the increase in intake air amount corresponds to an increase in scavenging flow rate. Therefore, in a case where the first intake air amount is greater than the second intake air amount, it is possible to predict that the scavenging will occur. The expression "a case where the first intake air amount is equal to or smaller than the second intake air amount" means a case where the intake air amount is decreased when the overlapping period becomes longer and a case where an air stream flowing in a direction opposite to an air flowing direction at the time of the scavenging, that is, internal exhaust gas recirculation (EGR) is generated during the overlapping period. Therefore, in a case where the first intake air amount is equal to or smaller than the second intake air amount, it is possible to predict that the scavenging will not occur. As described above, it is possible to accurately predict whether the scavenging will occur or not with a method different from that in the related art.

In the control device according to the first aspect of the disclosure, the internal combustion engine may be further provided with a variable valve mechanism configured to change the overlapping period in accordance with an operation state of the internal combustion engine, and the electronic control unit may be configured to limit the overlapping period to a value equal to or lower than an upper limit value in a case where the electronic control unit predicts that the scavenging will not occur, and remove the limitation on the overlapping period based on the upper limit value in a case where the electronic control unit predicts that the scavenging will occur.

A second aspect of the disclosure relates to a control method for an internal combustion engine. The internal combustion engine is provided with a turbocharger. The control method includes causing an electronic control unit to predict a first intake air amount that is an amount of air taken into the internal combustion engine in a case where an overlapping period in which both of an intake valve and an exhaust valve of a cylinder of the internal combustion engine are open is set to be a first period, causing the electronic control unit to predict a second intake air amount that is an amount of air taken into the internal combustion engine in a case where the overlapping period is set to be a second period shorter than the first period with a valve timing of the exhaust valve being advanced, causing the electronic control unit to predict that scavenging in which air blows from the intake valve side to the exhaust valve side through an inside of the cylinder will occur in the overlapping period in a case where the first intake air amount is greater than the second intake air amount, and causing the electronic control unit to predict that the scavenging will not occur in a case where the first intake air amount is equal to or smaller than the second intake air amount.

In the control method according to the second aspect of the disclosure, the internal combustion engine may be further provided with a variable valve mechanism configured to change the overlapping period in accordance with an operation state of the internal combustion engine. The control method may further include causing the electronic control unit to limit the overlapping period to a value equal to or lower than an upper limit value in a case where the electronic control unit predicts that the scavenging will not occur and causing the electronic control unit to remove the limitation on the overlapping period based on the upper limit value in a case where the electronic control unit predicts that the scavenging will occur.

According to the aspects of the disclosure, it is possible to provide a control device for an internal combustion engine and a control method for an internal combustion engine with which it is possible to accurately predict whether scavenging will occur or not with a method different from that in the related art.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
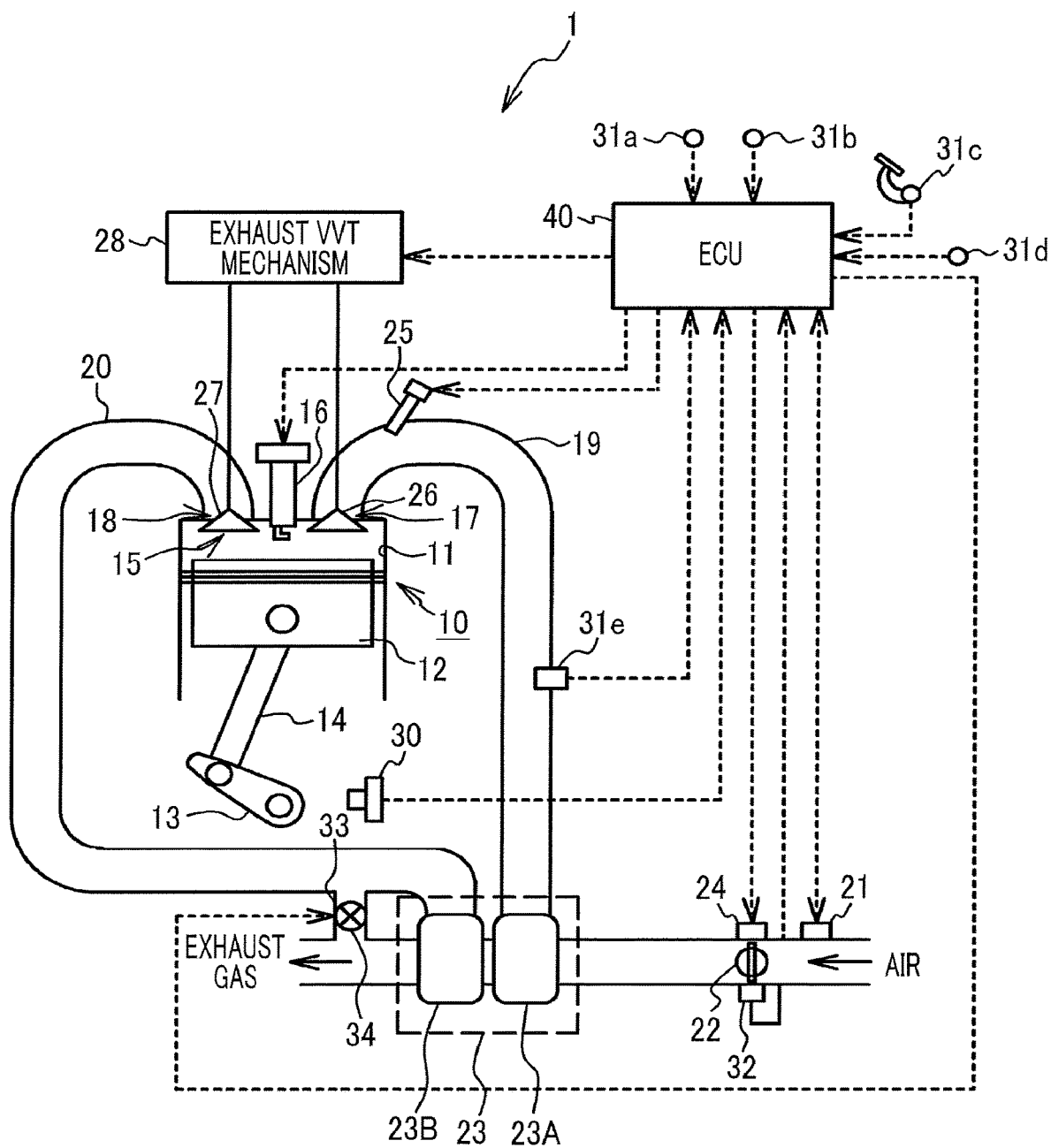
FIG. 1 is a schematic configuration view of an engine system.

FIG. 1 is a schematic configuration view of an engine system 1. The engine system 1 includes a control device of an engine 10. As the control device, an exhaust variable valve time (VVT) mechanism 28, an electronic control unit (ECU) 40, and the like are provided. The engine 10 is an engine provided with a turbocharger 23. The turbocharger 23 will be described later. The engine 10 is provided with a plurality of cylinders 11 (solely one cylinder is illustrated in FIG. 1) in a cylinder block. A piston 12 provided in each cylinder 11 is connected to a crankshaft 13 via a connecting rod 14 and a reciprocating motion of the piston 12 is converted into a rotary motion of the crankshaft 13 via the connecting rod 14. A cylinder head is attached to an upper portion of the cylinder block and a combustion chamber 15 in which an ignition plug 16 is provided is formed between the cylinder head and an upper end of the piston 12. An intake pipe 19 and an exhaust pipe 20 are respectively connected to an intake port 17 and an exhaust port 18 that are provided for each combustion chamber 15.

In the intake pipe 19, an air flow meter 21, a throttle valve 22, and a compressor 23A of the turbocharger 23 are provided while being arranged in this order from the upstream side in the intake pipe 19. The degree to which the throttle valve 22 is open is changed by a throttle actuator 24 such that the amount of air taken into the combustion chamber 15 is adjusted. The intake pipe 19 branches in an intake manifold that is provided downstream of the throttle valve 22 in an intake air flowing direction and the intake pipe 19 is connected to each combustion chamber 15 via a portion where the intake pipe 19 branches. In the intake pipe 19, an injector 25 that injects fuel with respect to intake air is provided.

The exhaust pipe 20 is provided with an exhaust turbine 23B of the turbocharger 23 and exhaust gas that is generated due to combustion in the combustion chamber 15 in each cylinder is introduced into the exhaust turbine 23B of the turbocharger 23 through an exhaust manifold. When the exhaust turbine 23B is operated by the introduced exhaust gas, a compressor 23A on the intake pipe 19 side is operated in accordance with the exhaust turbine 23B being operated and air is compressed on the intake pipe 19 side. Due to the air compression, the pressure in the intake pipe 19, that is, an intake pressure is increased and the combustion chamber 15 is sufficiently filled with air due to the pressure.

The exhaust pipe 20 is provided with a bypass path 33 that bypasses the exhaust turbine 23B and the bypass path 33 is provided with a wastegate valve 34. The wastegate valve 34 has a function of adjusting the boost pressure of the turbocharger 23. The wastegate valve 34 is, for example, a valve mechanism that includes an external actuator that can be opened and closed such as an electrically-driven valve, a vacuum-pump-operated negative-pressure-adjustment valve, or the like. The turbocharger 23 is a turbocharger. However, instead of the turbocharger, a supercharger may be provided.

The engine 10 is provided with intake valves 26 and exhaust valves 27 that respectively open and close the intake ports 17 and the exhaust ports 18 that are respectively connected to the intake pipes 19 and the exhaust pipes 20. The intake valves 26 and the exhaust valves 27 are operated to be opened and closed in accordance with the rotation of intake side camshafts and exhaust side camshafts drivingly coupled with the crankshafts 13. Therefore, each of the intake valves 26 and the exhaust valves 27 is operated to be opened and closed at a predetermined timing in synchronization with rotation of the crankshaft 13, that is, corresponding to a reciprocating motion of each piston 12. The engine 10 is provided with the exhaust VVT mechanism 28 that is a variable valve mechanism that variably sets a valve timing at which the exhaust valves 27 are opened or closed. The exhaust VVT mechanism 28 will be described later in detail.

The engine system 1 is provided with various sensors. Specifically, the various sensors are a crank angle sensor 30, cam angle sensors 31a, 31b, an accelerator pedal operation amount sensor 31c, an atmospheric pressure sensor 31d, the air flow meter 21, a throttle valve opening degree sensor 32, and the like. Detection signals from the sensors are input to the electronic control unit (ECU) 40 that performs various controls in the engine 10.

The ECU 40 is provided with a central processing unit (CPU), a random access memory (RAM), a read only memory (ROM), a storage device, and the like. The ECU 40 controls the engine 10 by executing a program stored in the ROM or the storage device. The ECU 40 performs scavenging prediction control, which will be described later. The scavenging prediction control is functionally realized by the CPU, the ROM, and the RAM. Hereinafter, for convenience, functions of the scavenging prediction control performed by the ECU 40 will be referred to as first and second prediction units, a scavenging prediction unit, and a controller. The details will be described later.

The ECU 40 performs predetermined calculation based on the detection signals from the various sensors. For example, based on a detection signal from the crank angle sensor 30, the rotation phase of the crankshaft 13, that is, a crank angle is calculated and the rotation speed of the engine 10 is calculated. Based on detection signals from the cam angle sensors 31*a*, 31*b*, the rotation phases of the intake side camshaft and the exhaust side camshaft, that is, cam angles are calculated. Based on a detection signal from the accelerator pedal operation amount sensor 31*c*, the operation amount of an accelerator pedal that is operated by a driver is calculated. Based on a detection signal from the atmospheric pressure sensor 31*d*, the atmospheric pressure around a vehicle in which the engine system 1 is installed is calculated. Based on a detection signal from the air flow meter 21, an intake air amount is calculated. Based on a detection signal from an intake pressure sensor 31*e*, the intake pressure, which is the pressure in the intake pipe 19, is calculated.

The exhaust VVT mechanism 28 will be described. The exhaust VVT mechanism 28 changes the rotation phase of the exhaust side camshaft relative to the crankshaft 13 by means of, for example, hydraulic pressure such that the valve timing of the exhaust valve 27 is continuously changed. Therefore, the phase angle of the exhaust valve 27 is advanced or retarded such that the valve timing of the exhaust valve 27 is changed. When the valve timing of the exhaust valve 27 is changed, an overlapping period in which both of the intake valve 26 and the exhaust valve 27 are open is also changed.

Figure 2A:
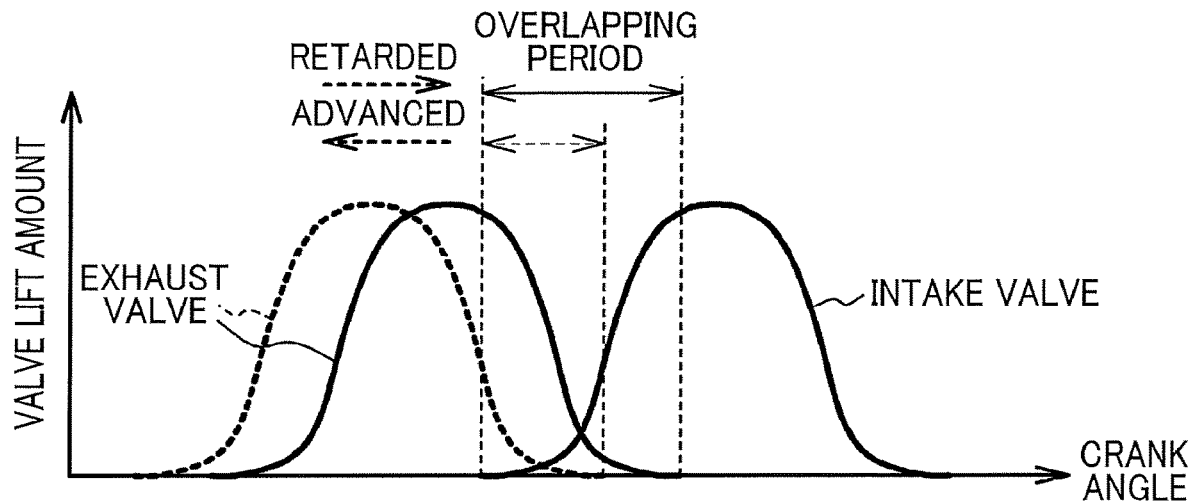
FIG. 2A is a graph illustrating valve timings of an intake valve and an exhaust valve corresponding to a crank angle.

FIG. 2A is a graph illustrating valve timings of the intake valve 26 and the exhaust valve 27 corresponding to the crank angle. In FIG. 2A, the vertical axis represents the valve lift amount and the horizontal axis represents the crank angle. As illustrated in FIG. 2A, when the valve timing of the exhaust valve 27 is advanced, the overlapping period is shortened. The ECU 40 calculates a target value of the overlapping period according to the operation state of the engine 10 that is figured out based on the various sensors and controls the valve timing of the exhaust valve 27 by means of the exhaust VVT mechanism 28 such that an actual overlapping period becomes the target value.

Figure 2B:
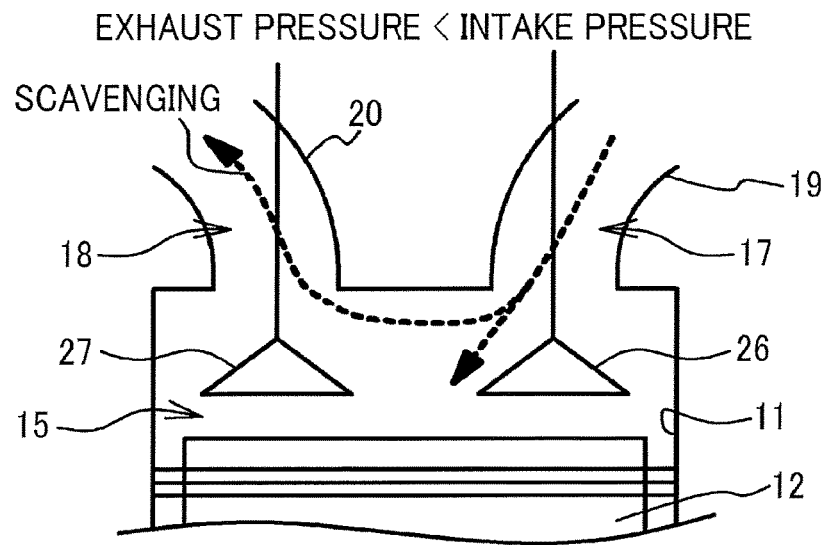
FIG. 2B is an explanatory view illustrating the way in which air flows during scavenging.

Scavenging will be described. In the engine 10 provided with the turbocharger 23, the intake pressure becomes higher than the exhaust pressure in a turbocharging region. In this case, during the overlapping period, so-called scavenging, in which air blows from the intake pipe 19 side to the exhaust pipe 20 through the combustion chamber 15 of the cylinder 11, may occur. FIG. 2B is an explanatory view illustrating the way in which air flows during the scavenging. When the amount of air blowing through the cylinder 11 during the scavenging (hereinafter, referred to as scavenging amount) is increased, the total amount of gas flowing into the exhaust turbine 23B is increased and the turbocharging of air performed by the compressor 23A is accelerated due to an increase in rotation speed of the exhaust turbine 23B, so that turbocharging responsiveness is further improved than in the related art. Since the amount of fresh air introduced into the cylinder 11 is also increased, the output torque of the engine 10 is improved.

Figure 2C:
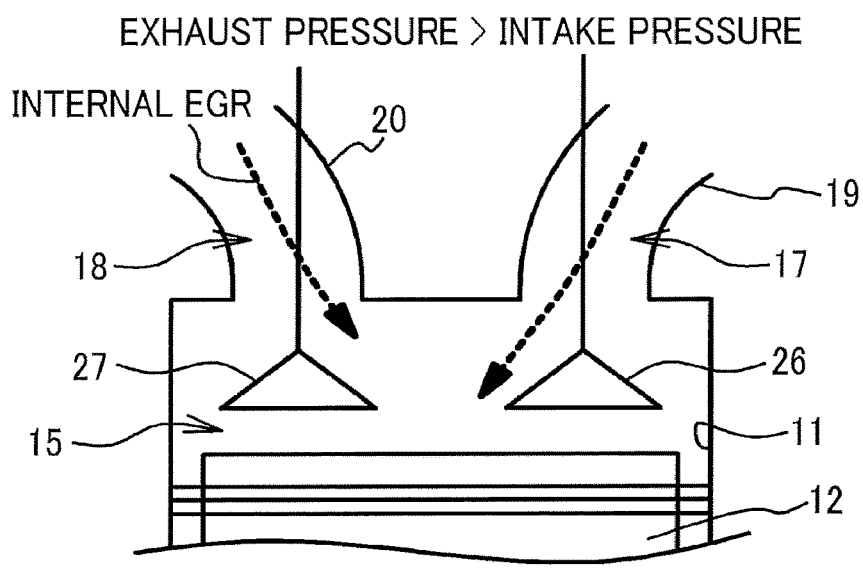
FIG. 2C is an explanatory view illustrating the way in which exhaust gas flows during internal EGR.

Meanwhile, in a natural aspiration region (NA region), the intake pressure becomes lower than the exhaust pressure. In this case, during the overlapping period, fresh air is introduced into the combustion chamber 15 from the intake pipe 19 but internal EGR in which a portion of exhaust gas is introduced into the combustion chamber 15 from the exhaust pipe 20 also occurs. FIG. 2C is an explanatory view illustrating the way in which exhaust gas flows during the internal EGR.

Figure 3:
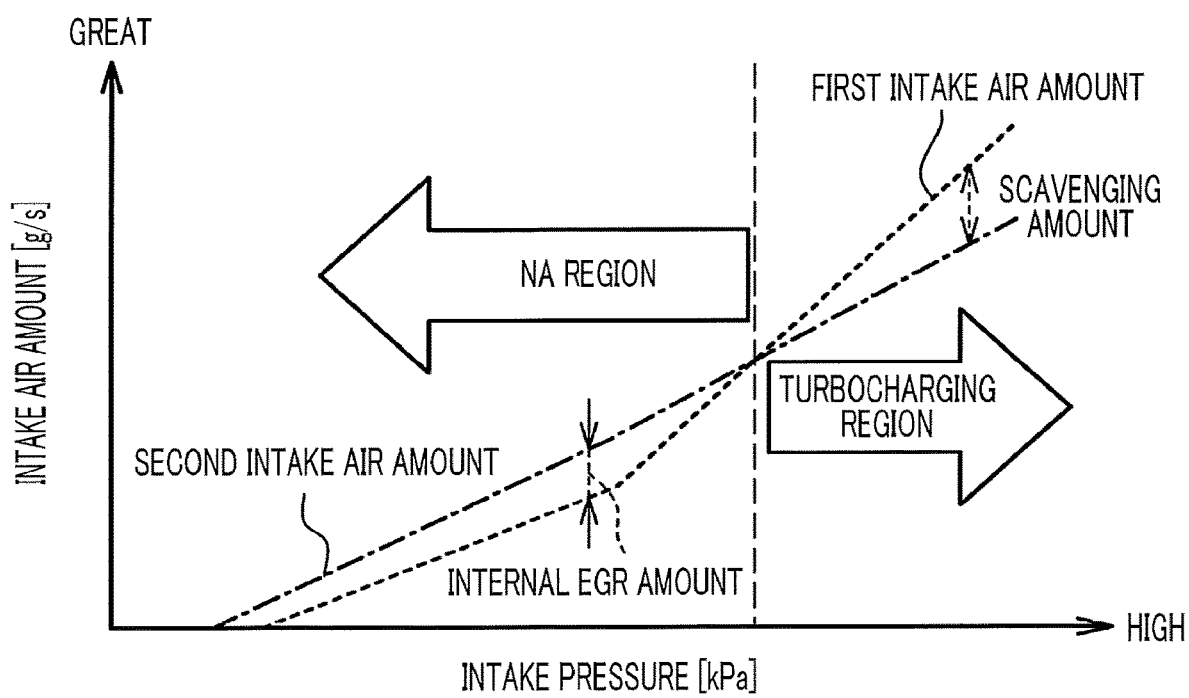
FIG. 3 is a graph illustrating a relationship between an intake pressure and an intake air amount.

FIG. 3 is a graph illustrating a relationship between the intake pressure and the intake air amount. The horizontal axis represents the intake pressure [kPa] and the vertical axis represents the intake air amount [g/s]. FIG. 3 illustrates the intake air amount (hereinafter, referred to as first intake air amount) corresponding to the intake pressure in a case where the overlapping period is set to be a first period by the exhaust VVT mechanism 28 and the intake air amount (hereinafter, referred to as second intake air amount) corresponding to the intake pressure in a case where the overlapping period is set to be a second period shorter than the first period, under a condition that the rotation speed of the engine 10 is constant. Examples of the second period do not include a period which results in the overlapping period being zero.

As illustrated in FIG. 3, in the turbocharging region in which the intake pressure is higher than the atmospheric pressure, the first intake air amount is greater than the second intake air amount. The reason for the above description is as follows. In the turbocharging region in which the scavenging occurs, the longer the overlapping period set by the exhaust VVT mechanism 28, the greater the flow rate of air flowing from the intake pipe 19 to the exhaust pipe 20 through the cylinder 11 and the intake air amount is increased corresponding to the increase in flow rate. Meanwhile, in the NA region in which the intake pressure is lower than the atmospheric pressure, the first intake air amount is smaller than the second intake air amount. The reason for the above description is as follows. In the NA region in which the intake pressure is lower than the exhaust pressure, the longer the overlapping period, the smaller the intake air amount since there is an air stream flowing in a direction opposite to an air flowing direction at the time of scavenging.

As described above, in the turbocharging region, the first intake air amount is greater than the second intake air amount. However, in the NA region, the first intake air amount is smaller than the second intake air amount. In an embodiment of the disclosure, the ECU 40 predicts the first and second intake air amounts in a case where the overlapping period is set to be the first period and a case where the overlapping period is set to be the second period and predicts whether the scavenging will occur or not based on the result of the prediction. Furthermore, the ECU 40 sets the overlapping period based on the result of the prediction.

Figure 4:
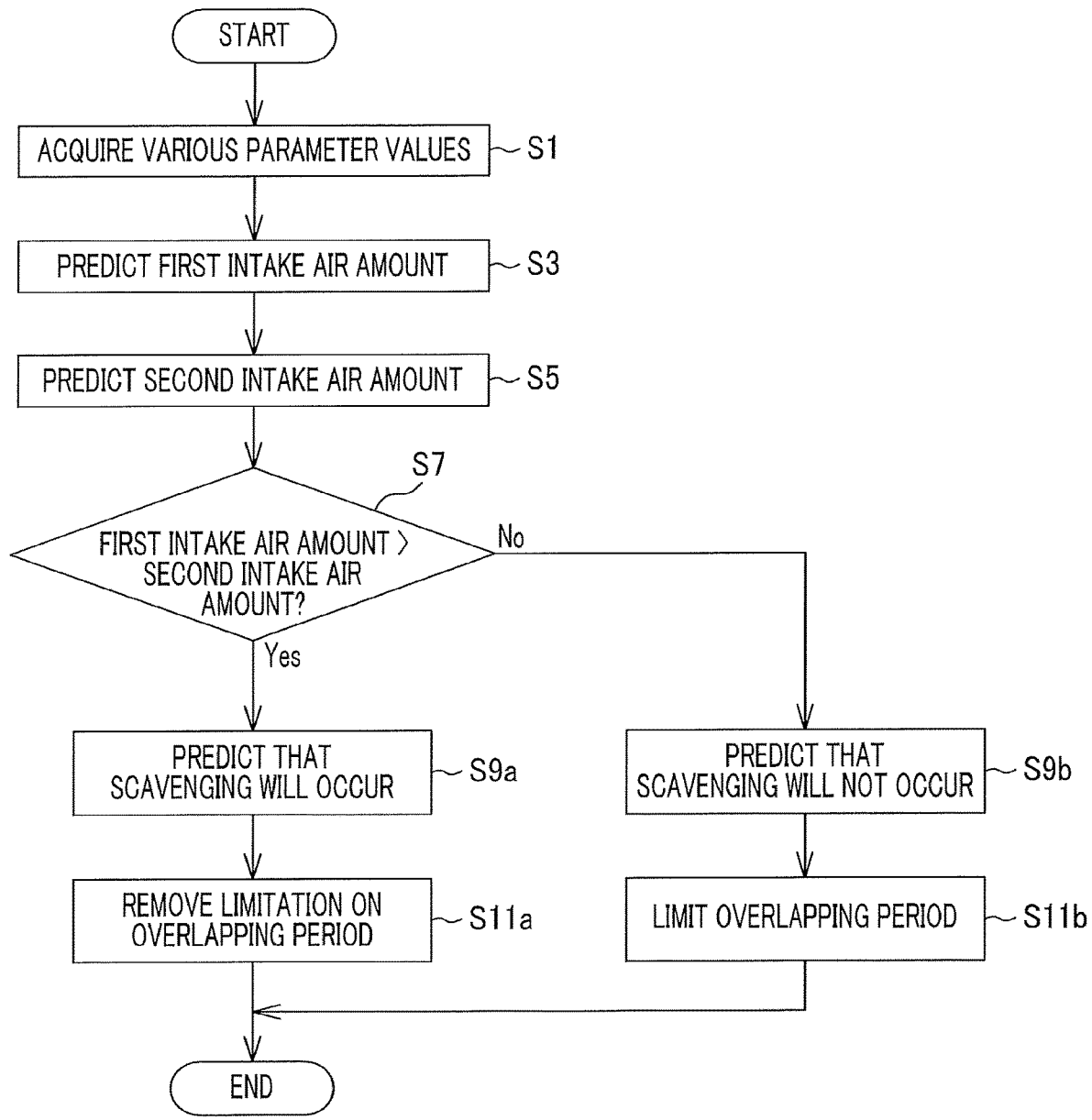
FIG. 4 is a flowchart illustrating an example of scavenging prediction control performed by an ECU.

FIG. 4 is a flowchart illustrating an example of the scavenging prediction control performed by the ECU 40. The scavenging prediction control is repeatedly performed each time a predetermined of period time elapses. First, various parameter values that are used to predict the first and second intake air amounts are acquired (step S1). Specifically, the various parameter values are the intake pressure, the rotation speed of the engine 10, the degree to which the wastegate valve 34 is open, the valve timings of the intake valve 26 and the exhaust valve 27, the atmospheric pressure, and the in-cylinder air amount. As described above, the intake pressure, the rotation speed of the engine 10, and the atmospheric pressure are respectively calculated based on detection signals from the intake pressure sensor 31*e*, the crank angle sensor 30, and the atmospheric pressure sensor 31d. The degree to which the wastegate valve 34 is open is calculated based on a driving current value or the like to an actuator that drives the wastegate valve 34. The valve timing of the intake valve 26 is a fixed value determined in advance since an intake VVT mechanism that changes the valve timing of the intake valve 26 is not provided in the embodiment. The valve timing of the exhaust valve 27 is calculated based on a detection signal from the crank angle sensor 30 and a detection signal from an exhaust cam angle sensor provided in the exhaust VVT mechanism 28. The in-cylinder air amount is calculated based on the intake pressure, the valve timings of the intake valve 26 and the exhaust valve 27, the rotation speed of the engine 10, and the atmospheric pressure.

Based on the various parameter values, the first intake air amount in a case where the overlapping period is set to be the first period is predicted (step S3). Based on the various parameter values, the second intake air amount in a case where the overlapping period is set to be the second period is predicted (step S5). A process in step S3 is an example of a process performed by the first prediction unit that predicts the first intake air amount that is an amount of air taken into the engine 10 in a case where the overlapping period is set to be the first period. A process in step S5 is an example of a process performed by the second prediction unit that predicts the second intake air amount that is an amount of air taken into the engine 10 in a case where the overlapping period is set to be the second period shorter than the first period since the valve timing of the exhaust valve 27 is advanced. The order in which the processes in step S3 and step S5 are performed is not limited and the processes may be performed at the same time.

Specifically, the ECU 40 predicts the first and second intake air amounts referring to a predetermined map. The map is acquired through an experiment in advance and is stored in a memory of the ECU 40. The intake air amount corresponding to the above described intake pressure, the rotation speed of the engine 10, the degree to which the wastegate valve 34 is open, the valve timings of the intake valve 26 and the exhaust valve 27, the atmospheric pressure, and the in-cylinder air amount is prescribed in the map. A relationship between the various parameter values and the intake air amount is prescribed as follows. In principle, as the intake pressure becomes higher, the rotation speed of the engine 10 becomes higher, the degree to which the wastegate valve 34 is open becomes smaller, the atmospheric pressure becomes higher, and the in-cylinder air amount becomes smaller, the intake air amount becomes greater. Here, since the intake air amount with respect to the various parameter values acquired in the experiment in advance is prescribed in the map as described above, the influence of intake pulsation and exhaust pulsation that may occur in an actual case is also reflected on the intake air amount prescribed in the map. Therefore, it is possible to accurately predict the first and second intake air amounts by referring to the map.

Determination is made on whether the first intake air amount is greater than the second intake air amount (step S7). In a case where the result of the determination is positive, the ECU 40 predicts that the scavenging will occur (step S9a). In a case where the result of the determination is negative, the ECU 40 predicts that the scavenging will not occur (step S9b). Since it is possible to accurately predict the first and second intake air amounts as described above, it is possible to accurately predict whether the scavenging will occur or not. In a case where the ECU 40 predicts that the scavenging will occur, a scavenging occurrence flag is set to "ON" and in a case where the ECU 40 predicts that the scavenging will not occur, the scavenging occurrence flag is set to "OFF". The processes in steps S7, S9a, and S9b are a series of processes performed by the scavenging prediction unit that predicts that the scavenging will occur in the overlapping period in a case where the first intake air amount is greater than the second intake air amount and that predicts that the scavenging will not occur in the overlapping period in a case where the first intake air amount is equal to or smaller than the second intake air amount.

When the ECU 40 predicts that the scavenging will not occur, the overlapping period is limited to a value equal to or lower than a predetermined upper limit value (step S11b). That is, even in a case where the target value of the overlapping period that is determined in accordance with the operation state of the engine 10 exceeds the upper limit value, the actual overlapping period is limited to a value equal to or lower than the upper limit value. Therefore, an increase in internal EGR amount, which is caused by expansion of the overlapping period in the NA region in which the scavenging does not occur, is suppressed, and thus it is possible to suppress a misfire caused by an excessive internal EGR amount. The upper limit value is set to a value that contributes to an improvement in fuel efficiency in a range in which a misfire caused by an excessive internal EGR amount does not occur.

When the ECU 40 predicts that the scavenging will occur, the limitation on the overlapping period is removed (step S11a). Therefore, the overlapping period is controlled such that the overlapping period becomes the target value corresponding to the operation state of the engine 10, and thus the scavenging amount is increased in comparison with a case where the overlapping period is limited. Therefore, the turbocharging responsiveness is improved and the output torque of the engine 10 is also improved. The processes in steps S11a and S11b are a series of processes performed by the controller that limits the overlapping period to be a value equal to or lower than the upper limit value in a case where the ECU 40 predicts that the scavenging will not occur and that removes the limitation on the overlapping period based on the upper limit value in a case where the ECU 40 predicts that the scavenging will occur.

Figure 5:
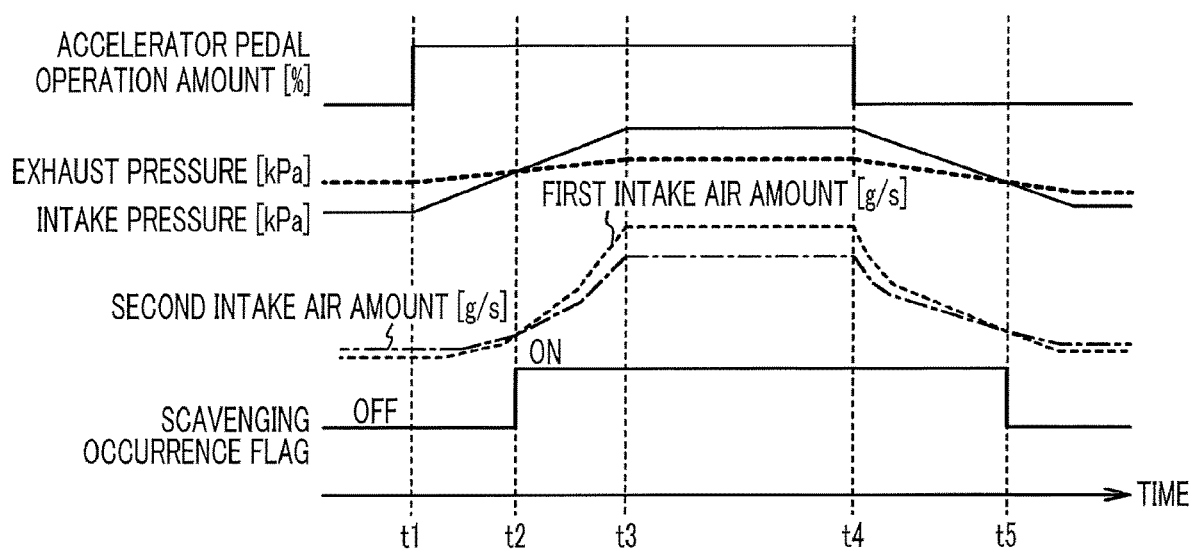
FIG. 5 is a timing chart illustrating first and second intake air amounts and a scavenging occurrence flag.

FIG. 5 is a timing chart illustrating the first and second intake air amounts and the scavenging occurrence flag. FIG. 5 illustrates a case where the operation state of the engine 10 transitions into the turbocharging region from the NA region and returns to the NA region again. In FIG. 5, along with the first and second intake air amounts and the scavenging occurrence flag, the accelerator pedal operation amount, the exhaust pressure, and the intake pressure are illustrated. The exhaust pressure is the pressure in a space before the exhaust turbine 23B.

When the accelerator pedal operation amount is increased at time t1, the intake pressure gradually increases and the exhaust pressure gently increases. The intake pressure becomes lower than the exhaust pressure although the increase in exhaust pressure is smaller than the increase in intake pressure. Therefore, it is predicted that the first intake air amount is equal to or smaller than the second intake air amount and the overlapping period is limited since it is estimated that the current operation region is the NA region. When the intake pressure exceeds the exhaust pressure at time t2, it is predicted that the first intake air amount is greater than the second intake air amount and the scavenging occurrence flag is set to "ON" from "OFF". Therefore, the limitation on the overlapping period is removed.

When the exhaust pressure reaches a target value corresponding to the accelerator pedal operation amount at time t3, the intake pressure and the exhaust pressure become substantially constant with the intake pressure being higher than the exhaust pressure. When the accelerator pedal operation amount is decreased at time t4, the intake pressure gradually decreases and the exhaust pressure gently decreases although the decrease in exhaust pressure is smaller than the decrease in intake pressure. When the intake pressure becomes equal to or lower than the exhaust pressure at time t5, the first intake air amount becomes equal to or smaller than the second intake air amount, the scavenging occurrence flag is set to "OFF" from "ON", and the overlapping period is limited.

As described above, since the overlapping period is limited or the limitation on the overlapping period is removed in accordance with the result of the prediction about whether the scavenging will occur or not, the misfire in the NA region is suppressed and the turbocharging responsiveness in the turbocharging region is improved.

Even in a case where the control is performed such that an actual overlapping period becomes zero, it is possible to predict whether the scavenging will occur or not in a case where the control is performed such that the overlapping period is provided based on the predicted first and second intake air amounts. Therefore, it is possible to predict whether the scavenging will occur or not without depending on the actual overlapping period and to obtain an opportunity to predict whether the scavenging will occur or not.

It can also be conceived to provide an in-cylinder pressure sensor that detects the pressure in the cylinder 11 and to predict whether the scavenging will occur or not based on a detection value of the in-cylinder pressure sensor. However, in this case, there is a possibility of an increase in manufacturing cost of the engine 10. In the embodiment, the in-cylinder pressure sensor as described above is not needed, and thus an increase in manufacturing cost of the engine 10 is suppressed.

Regarding the prediction about whether the scavenging will occur or not, it can also be conceived to predict whether the scavenging will occur or not based on predicted intake air amounts in a case where the valve timing of the intake valve 26 is changed such that the overlapping period is set to be the first period and a case where the valve timing of the intake valve 26 is changed such that the overlapping period is set to be the second period under a condition that the valve timing of the exhaust valve 27 is constant. However, when the valve timing of the intake valve 26 is changed, the efficiency at which the cylinder 11 is filled with air is changed and the intake air amount is also changed due to the change. Therefore, there is a possibility that it is not possible to accurately predict whether the scavenging will occur or not. In the embodiment, as described above, the prediction is made on whether the scavenging will occur or not based on the predicted first and second intake air amounts in a case where the valve timing of the exhaust valve 27 is changed instead of the valve timing of the intake valve 26 such that the overlapping period is set to be the first period and a case where the valve timing of the exhaust valve 27 is changed instead of the valve timing of the intake valve 26 such that the overlapping period is set to be the second period. Since the efficiency at which the cylinder 11 is filled with air is approximately not changed even when the valve timing of the exhaust valve 27 is changed, it is possible to accurately predict whether the scavenging will occur or not.

For example, it can also be conceived to estimate the intake pressure and the exhaust pressure based on the various parameter values and to predict that the scavenging will occur in a case where the intake pressure is higher than the exhaust pressure. In this case, it is considered that a method of estimating the intake pressure and a method of estimating the exhaust pressure are different from each other. Therefore, there is a possibility that the form of an error between an estimated intake pressure and an actual intake pressure and the form of an error between an estimated exhaust pressure and an actual exhaust pressure are different from each other. For example, there is a possibility that the estimated intake pressure is lower than the actual intake pressure while the estimated exhaust pressure is higher than the actual exhaust pressure. In such a case, even though the actual intake pressure is higher than the actual exhaust pressure, the estimated intake pressure is lower than the estimated exhaust pressure and there is a possibility that it is predicted that the scavenging will not occur even though the scavenging actually occurs. With regard to the above description, in the embodiment, since the first and second intake air amounts, which are predicted via the same method, are compared with each other, even in a case where there are errors in the predicted first and second intake air amounts, the forms of errors may be the same as each other in many cases. For example, a case where the predicted first intake air amount is smaller than an actual intake air amount corresponding to the predicted first intake air amount may be a case where the predicted second intake air amount is also smaller than an actual intake air amount corresponding to the predicted second intake air amount. Therefore, in a case where the forms of the errors are as described above, the result of comparison between the predicted first and second intake air amounts is not greatly influenced, and thus it is possible to accurately predict whether the scavenging will occur or not.

Hereinabove, the embodiment of the disclosure has been described in detail. However, the disclosure is not limited to a specific embodiment as described above and various modifications and changes can be made within the scope of the gist of the disclosure described in claims.

In the embodiment, the actual overlapping period is changed by the exhaust VVT mechanism 28. However, the disclosure is not limited to this. That is, the actual overlapping period may be changed by the intake VVT mechanism that changes the valve timing of the intake valve 26 or by both of the exhaust VVT mechanism and the intake VVT mechanism. In any case, any configuration can be adopted as long as it is possible to predict the first and second intake air amounts in a case where the valve timing of the exhaust valve 27 is changed such that the overlapping period is set to be the first period and a case where the valve timing of the exhaust valve 27 is changed such that the overlapping period is set to be the second period at the time of predicting on the first and second intake air amounts on an assumption that the exhaust VVT mechanism is present.

For example, the following method may also be adopted. The above described map for predicting the first and second intake air amounts is created through an experiment by using an engine with the exhaust VVT mechanism installed therein. Map data created in this manner may be stored in a memory of an ECU that controls an engine that is the same as the engine used for creation of the map except that an intake VVT mechanism is installed therein but an exhaust VVT mechanism is not installed therein. The map data created in this manner may be stored in a memory of an ECU that controls an engine that is the same as the engine used for creation of the map except that both of an intake VVT mechanism and an exhaust VVT mechanism are installed therein. In this case, it is possible to accurately predict whether the scavenging will occur or not even for an engine in which an intake VVT mechanism is solely provided and an engine in which both of an intake VVT mechanism and an exhaust VVT mechanism are provided. Furthermore, when the overlapping period is limited or the limitation on the overlapping period is removed in accordance with the result of a prediction about whether the scavenging will occur or not, a misfire in the NA region can be suppressed and the turbocharging responsiveness in the turbocharging region is improved even in the case of the engines as described above.

What is claimed is:

1. A control device for an internal combustion engine provided with a turbocharger, and an exhaust VVT mechanism, the control device comprising:
   an electronic control unit; and
   a non-transitory computer-readable medium encoded with executable instructions, which when executed by the electronic control unit cause the electronic control unit to
      predict a first intake air amount that is an amount of air taken into the internal combustion engine in a case where an overlapping period in which both of an intake valve and an exhaust valve of a cylinder of the internal combustion engine are open is set to be a first period,
      predict a second intake air amount that is an amount of air taken into the internal combustion engine in a case where the overlapping period is set to be a second period shorter than the first period with a valve timing of the exhaust valve being advanced,
      predict that scavenging in which air blows from the intake valve side to the exhaust valve side through an inside of the cylinder will occur in the overlapping period in a case where the first intake air amount is greater than the second intake air amount,
      predict that the scavenging will not occur in a case where the first intake air amount is equal to or smaller than the second intake air amount and
      control the valve timing of the exhaust valve by the exhaust VVT mechanism based on the result of the prediction of the scavenging occurrence.

2. The control device according to claim 1, wherein:
   the exhaust VVT mechanism is configured to change the overlapping period in accordance with an operation state of the internal combustion engine; and
   the non-transitory computer-readable medium causes the electronic control unit to
      limit the overlapping period to a value equal to or lower than an upper limit value in a case where the electronic control unit predicts that the scavenging will not occur, and
      remove the limitation on the overlapping period based on the upper limit value in a case where the electronic control unit predicts that the scavenging will occur.

3. A control method for an internal combustion engine provided with a turbocharger, and an exhaust VVT mechanism, the control method comprising:
   causing an electronic control unit to predict a first intake air amount that is an amount of air taken into the internal combustion engine in a case where an overlapping period in which both of an intake valve and an exhaust valve of a cylinder of the internal combustion engine are open is set to be a first period;
   causing the electronic control unit to predict a second intake air amount that is an amount of air taken into the internal combustion engine in a case where the overlapping period is set to be a second period shorter than the first period with a valve timing of the exhaust valve being advanced;
   causing the electronic control unit to predict that scavenging in which air blows from the intake valve side to the exhaust valve side through an inside of the cylinder will occur in the overlapping period in a case where the first intake air amount is greater than the second intake air amount;
   causing the electronic control unit to predict that the scavenging will not occur in a case where the first intake air amount is equal to or smaller than the second intake air amount;
   causing the electronic control unit to control the valve timing of the exhaust valve by the exhaust VVT mechanism based on the result of the prediction of the scavenging occurrence.

4. The control method according to claim 3, wherein:
   the exhaust VVT mechanism is configured to change the overlapping period in accordance with an operation state of the internal combustion engine; and
   the control method further comprises
   causing the electronic control unit to limit the overlapping period to a value equal to or lower than an upper limit value in a case where the electronic control unit predicts that the scavenging will not occur, and
   causing the electronic control unit to remove the limitation on the overlapping period based on the upper limit value in a case where the electronic control unit predicts that the scavenging will occur.

* * * * *